(12) United States Patent
Jäderberg

(10) Patent No.: US 12,030,236 B2
(45) Date of Patent: Jul. 9, 2024

(54) METHOD AND TOOL FOR EMBOSSING

(71) Applicant: TC Tech Sweden AB (PUBL.), Spånga (SE)

(72) Inventor: Jan Jäderberg, Spånga (SE)

(73) Assignee: TC TECH SWEDEN AB (PUBL.), Spånga (SE)

( * ) Notice: Subject to any disclaimer, the term of this patent is extended or adjusted under 35 U.S.C. 154(b) by 0 days.

(21) Appl. No.: 17/255,448

(22) PCT Filed: Jul. 1, 2019

(86) PCT No.: PCT/EP2019/067534
§ 371 (c)(1),
(2) Date: Dec. 23, 2020

(87) PCT Pub. No.: WO2020/007769
PCT Pub. Date: Jan. 9, 2020

(65) Prior Publication Data
US 2021/0187818 A1    Jun. 24, 2021

(30) Foreign Application Priority Data
Jul. 3, 2018    (EP) .................................... 18181314

(51) Int. Cl.
*B29C 59/00*    (2006.01)
*B29C 59/02*    (2006.01)
*B29D 11/00*    (2006.01)

(52) U.S. Cl.
CPC ............ *B29C 59/002* (2013.01); *B29C 59/02* (2013.01); *B29D 11/00663* (2013.01)

(58) Field of Classification Search
CPC ..... B29C 59/02; B29C 59/002; B29C 43/021; B29C 43/52; B29C 43/58;
(Continued)

(56) References Cited

U.S. PATENT DOCUMENTS 6,758,664 B1 * 7/2004 Curtiss .................... B29C 59/02
425/406
2008/0196607 A1    8/2008 Rinko
(Continued)

FOREIGN PATENT DOCUMENTS

CN    104181768 A    12/2014
EP    2832535 A1    2/2015
(Continued)

OTHER PUBLICATIONS

International Search Report and Written Opinion issued in corresponding international application No. PCT/EP2019/067534 dated Dec. 17, 2019, all enclosed pages cited.

*Primary Examiner* — Jerzi H Moreno Hernandez
(74) *Attorney, Agent, or Firm* — BURR & FORMAN LLP

(57) ABSTRACT

The present disclosure relates to a method for embossing a plastic sheet and a corresponding tool (1). The plastic sheet is pressed between first and second tool halves (3, 5) while being heated such that a pattern is imprinted on first and second faces (19, 21) of the plastic sheet. Reference marks (31, 33) are imprinted on both faces of the plastic sheet and the embossed plastic sheet is evaluated optically to determine error data based on the relative position of the first and second reference marks. This allows to adjust the embossing tool based on the error data for subsequent embossing operations.

13 Claims, 2 Drawing Sheets

(58) Field of Classification Search
CPC ....... B29C 2043/5833; B29D 11/00663; B29L 2011/0075
See application file for complete search history.

(56) References Cited

U.S. PATENT DOCUMENTS

| | | | | |
|---|---|---|---|---|
| 2010/0140312 | A1* | 6/2010 | Dong ................... | G02B 5/045 |
| | | | | 226/44 |
| 2011/0058239 | A1* | 3/2011 | Lundvall ............... | B29C 59/046 |
| | | | | 359/9 |
| 2013/0147070 | A1* | 6/2013 | Kast ................... | B29D 11/0048 |
| | | | | 425/150 |
| 2014/0346700 | A1* | 11/2014 | Sato .................... | G03F 7/0002 |
| | | | | 425/169 |
| 2014/0367886 | A1* | 12/2014 | Jaderberg .............. | B29C 59/002 |
| | | | | 264/293 |
| 2015/0318013 | A1* | 11/2015 | Kitahara ................ | B32B 3/30 |
| | | | | 156/219 |
| 2015/0360504 | A1* | 12/2015 | Cappelle ............... | B44C 1/24 |
| | | | | 264/40.1 |

FOREIGN PATENT DOCUMENTS

| | | |
|---|---|---|
| TW | M485590 U | 9/2014 |
| WO | 2013002703 A1 | 1/2013 |

\* cited by examiner

METHOD AND TOOL FOR EMBOSSING

FIELD OF THE INVENTION

The present disclosure relates to a method for embossing a plastic sheet between a first and a second tool half, where the plastic sheet is pressed and heated between the tool halves while a pattern is imprinted on first and second faces of the plastic sheet.

TECHNICAL BACKGROUND

Such a method and tool are described for instance in WO-2013/002703-A1 where an actively heated tool is used for instance to produce so-called lightguide plates, LGPs, by imprinting a fine pattern on a thin, transparent plastic sheet.

One problem with such production methods and tools is how to improve their yields in terms of finished products that fulfil quality requirements.

SUMMARY OF THE INVENTION

One object of the present disclosure is therefore to provide an embossing method and tool that provides improved yield. This is obtained with an embossing method as defined in claim 1. More specifically, in a method of the initially mentioned kind, there is imprinted at least a first reference mark on the first face of the plastic sheet and at least a second reference mark on the second face of the plastic sheet. The embossed plastic sheet is evaluated with optical means to determine error data based on the relative position of the first and second reference marks, and the embossing tool adjusted based on the error data for subsequent embossing operations. This allows any occurring misalignment between stampers used on the top and bottom faces of the plastic sheet to be detected immediately. This is particularly important if the stampers used float with respect to their respective tool halves. If so, one of the stampers may begin to drift, and this can be readily detected.

It is possible to carry out the adjustment by moving the first tool half by means of a plurality of servos, typically three servos, such that the tool halves are closed in an inclined manner, thereby moving the first stamper relative to the second. This allows to control the relative position of the stampers during pressing such that the misalignment between the stampers can be kept within allowed limits, even without interrupting production.

The tool may be configured to make four or more reference marks on the plastic sheet, and first and second cameras evaluate the reference marks at different locations on the plastic sheet. The spaced-apart registering simplifies the detection of a condition where one stamper begins to rotate.

Typically, the reference marks are made separate from an area where a fine optical pattern is embossed e.g. for a lightguide plate.

There is also considered a method and a corresponding tool for embossing a plastic sheet between a first and a second tool half, wherein the plastic sheet is pressed and heated between the tool halves while a pattern is imprinted on first and second faces of the plastic sheet by means of a first and a second stamper associated with the first and second tool halves respectively. The first tool half is configured to be moved by a plurality of servos, typically three, and the first tool half is moved towards the second tool half in an inclined manner, thereby moving the location of one stamper relative to the other when the tool is closed.

DETAILED DESCRIPTION

The present disclosure relates to a method and a tool for embossing a plastic sheet. An example of a pressing embossing tool is shown in WO-2013/002703-A1. Such a tool may be used for instance to produce so-called lightguide plates, LGPs, for graphic display devices and TVs.

Figure 1:
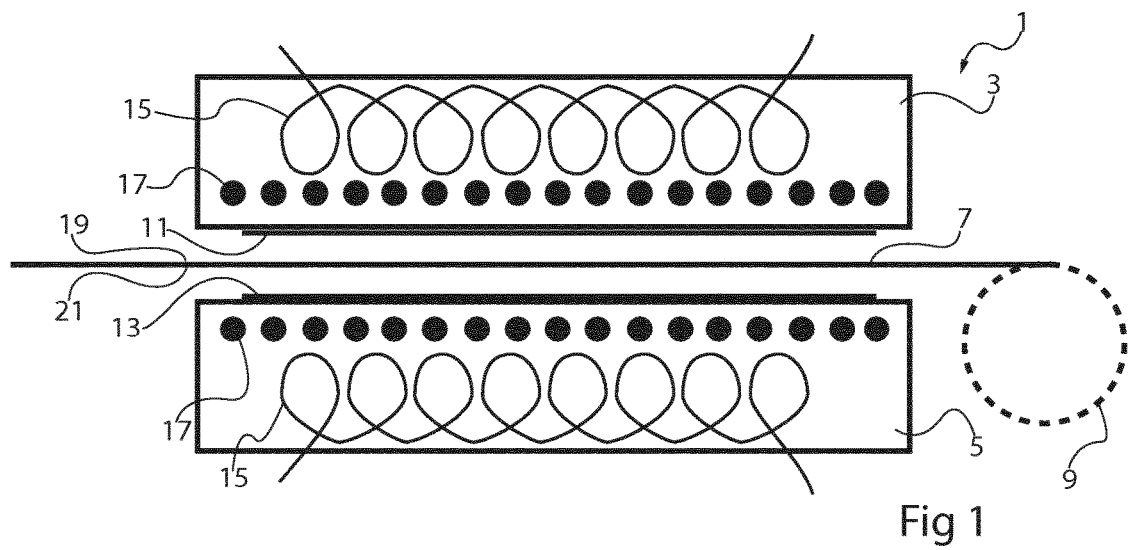
FIG. 1 schematically describes an embossing tool.

FIG. 1 illustrates schematically an embossing tool 1. The tool has an upper 3 and a lower 5 tool half, and a plastic sheet blank 7 is pressed with a high force during a part of a process cycle, and during that stage a fine pattern may be embossed in either or both surfaces of the blank by means of upper 11 and lower 13 stampers. As illustrated, that blank may optionally be fed from a blank roll 9. The pressing may be made more efficient by heating the surfaces coming into contact with the blank 7, i.e. the stampers 11, 13 during pressing, by means of a heating arrangement including a coil 15. Further, during a subsequent phase, the same surfaces may be cooled by cooling means 17, such as ducts conveying a cooling medium. The tool is then opened, and the embossed plastic sheet is removed giving room for a new blank 7. The process cycle may be concluded in e.g. 30 seconds.

The stampers 11, 13 provide the fine patterns to the upper 19 and lower 21 surfaces of the plastic sheet 7, and may consist of thin, flat sheet structures in a ferromagnetic material. As described in the aforementioned document, the stampers may float in relation to the underlying tool half (as seen from the blank to be embossed). This allows the stampers to expand and contract freely during the heating and cooling phases of the embossing process. Had the stampers for instance been screwed to the underlying tool half, they could have been deformed to some extent by the screwed connection to the tool half when heated. Instead, the lower stamper 13 may simply rest on the lower tool half 5, and the upper stamper 11 may be kept at the upper tool half 3 using a vacuum technique.

When pressing is applied, the stampers 11, 13 may sometimes drift slightly with regard to its tool half, and this drift need not be uniform, that is the stampers may also drift mutually. Even if some misalignment between the patterns embossed in upper 19 and lower 21 surfaces may be allowed, this could imply problems. The drift may be very small, fractions of micrometers, but after a number of cycles the accumulated misalignment may be unacceptable.

The present disclosure relates to methods for detecting such a misalignment. The present disclosure also relates to methods for dealing with such a misalignment.

Figure 2:
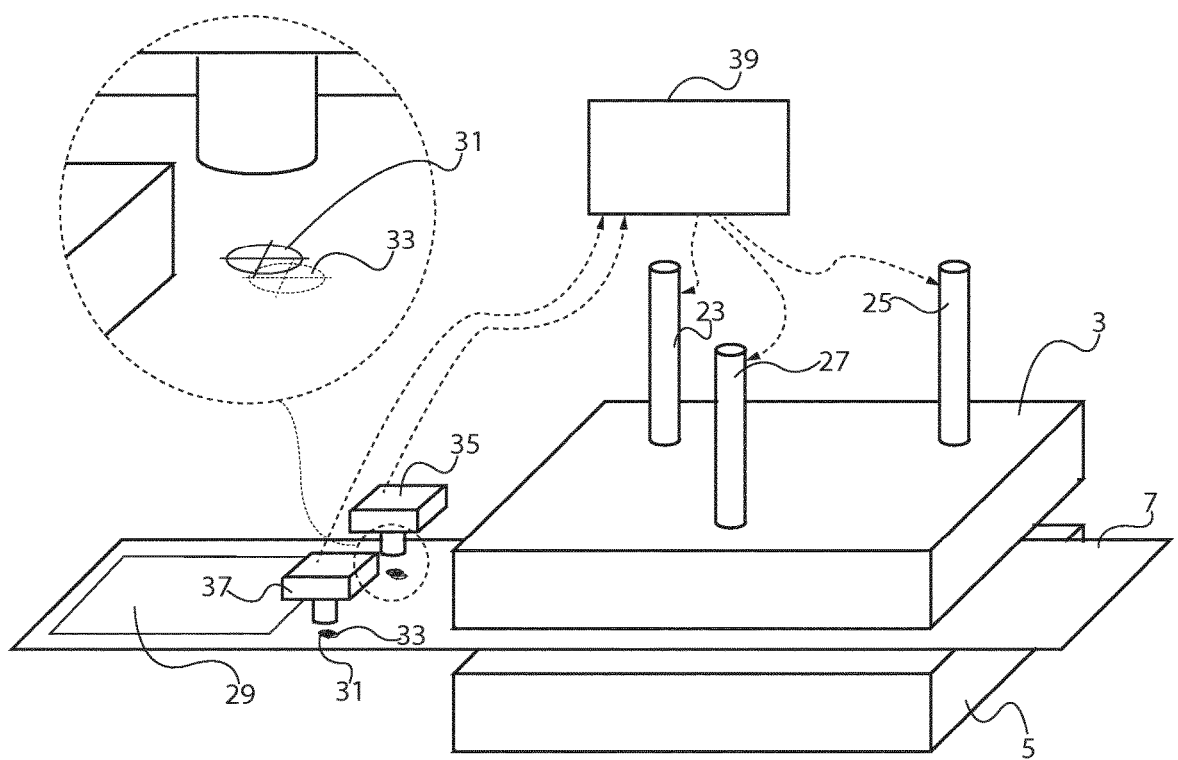
FIG. 2 illustrates schematically an embossing tool modified to compensate for stamper drift.

FIG. 2 illustrates schematically an embossing tool modified to compensate for stamper drift. As before, a blank 7 is pressed between a first 3 and a second 5 tool half.

Here, the first tool half 3 is moveable upwards and downwards by means of three servos/actuators 23, 25, 27, while the second tool half 5 is fixed. The use of the three servos will be discussed further later on.

When the blank 7 is embossed with e.g. a lightguide plate pattern 29, reference markers are embossed thereon at the same time. Typically, this is done outside the pattern 29, although this is not necessary. At least one reference marker 31 (in the illustrated case two), is embossed on the first, top surface of the plastic sheet 7, and at least one reference 33 mark is embossed on the second, bottom surface of the plastic sheet 7.

Those reference markers are embossed using the upper and lower stampers 11, 13. Thereby any misalignment between the upper and lower stampers can be detected by optically recording a reference marker 31 on the top surface, and a corresponding reference marker 33 on the bottom surface. One is registered directly and the other through the plastic sheet 7 which is at least partially transparent. As illustrated in the enlarged portion of FIG. 2, a misalignment may be detected as two patterns slightly displaced, which are recorded by a camera 35. In the illustrated case two cameras 35, 37 are used which are spaced apart, suitably at least 70 mm, e.g. 200 mm. This allows not only offsets in orthogonal directions (x, y) of the plastic sheet plane to be detected, but also the detecting of one of the stampers rotating about an axis orthogonal to that plane and in relation to the other stamper. Detection of a rotating movement can however also be detected using a single camera, as will be discussed. The cameras may be connected to a control unit 39 that adjusts the tool's operation as will be discussed.

Figure 3:
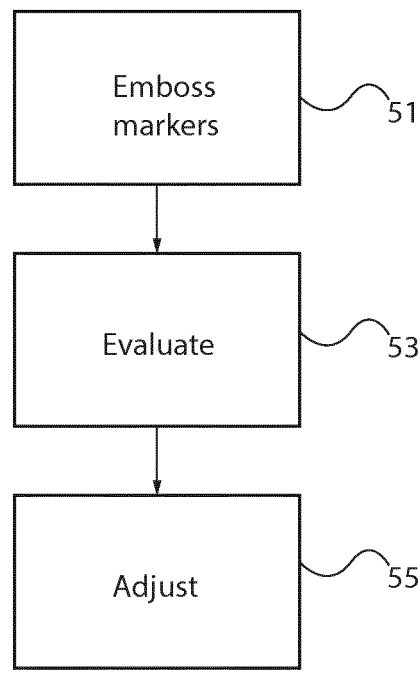
FIG. 3 illustrates a detection method.

FIG. 3 thus describes a basic detection method, where markers are embossed 51 on the top and bottom surfaces. after embossing, the relative positions of those markers are evaluated 53, and, if needed, the tool is adjusted 55 to deal with any detected misalignment, thereby improving the alignment in subsequent embossing operations on new plastic sheet blanks. The adjusting may be carried out using a multiple-servo technique, as will be described, although other options would be possible.

Figure 4A:
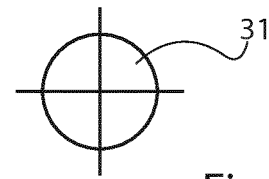
FIG. 4A-C illustrate examples of reference markers.
Figure 4B:
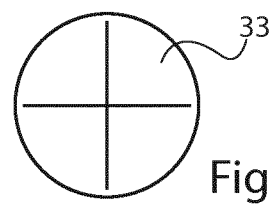
Figure 4C:
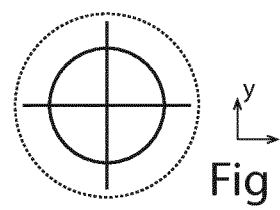

FIGS. 4A-C illustrate possible reference markers. FIG. 4A shows a possible top side marker 31 comprising a cross with a centered circle. FIG. 4B shows a possible bottom side marker 33 comprising an identical cross and a centered circle which is larger than the one on the top side. FIG. 4C shows a possible image registered by a camera when the top and bottom reference markers are perfectly aligned. It should be noted that this configuration provides an option to detect orthogonal direction errors (x, y) and any rotation which may occur even though this point may be well aligned. A relatively large rotation may however be required to make the bottom side marker's 33 cross visible, and therefore it may be preferred to use a two-camera solution to test the alignment at two locations on the plastic sheet 7, preferably spaced apart 70 mm, as mentioned.

In this way, any misalignment between the upper and lower stamper can be determined. While it would be possible to temporarily stop production and adjust the position of the stampers, the present disclosure suggests another solution for the adjustment function.

With reference again to FIG. 2, the upper tool half 3 is raised and lowered by three servos 23, 25, 27 which may be controlled individually. Therefore, it is possible to lower the upper tool half 3 towards the lower tool half 5 in an inclined manner, such that, when closing the tool, there is formed a wedge-shaped space in between the tool halves 3, 5.

Figure 5:
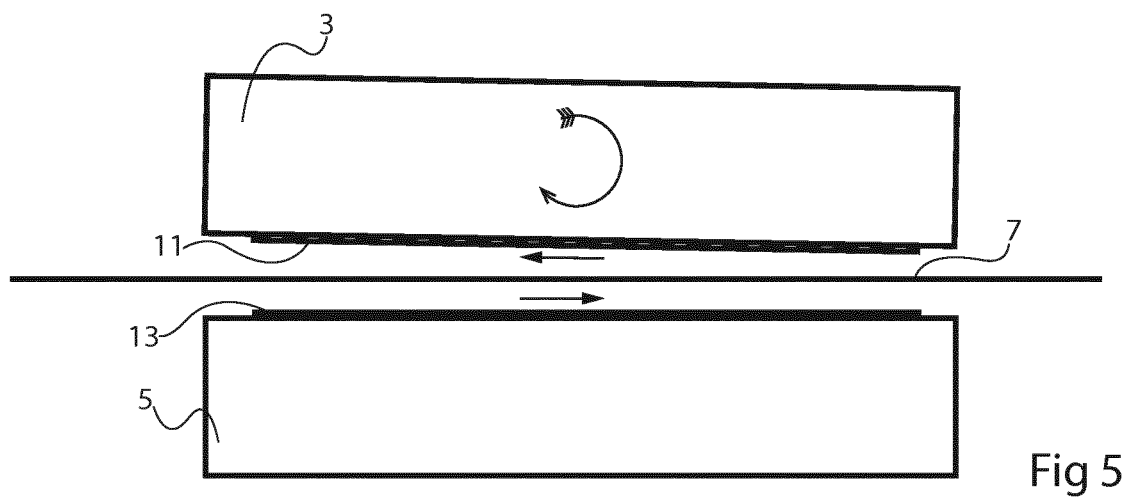
FIG. 5 illustrates the offsetting of a stamper by means of an inclined tool half.

This is illustrated in FIG. 5, where the upper tool half 3 has been inclined slightly by rotating clockwise about one degree. It should be noted that even this inclination is somewhat exaggerated, an inclination of about 0.1 degrees may be suitable to achieve the desired effect to be described. This inclination makes the space between the tool half 3 and the plastic sheet 7 slightly wedge-shaped. In the case illustrated in FIG. 5 the rightmost part of the upper stamper 11 will become pressed first. This induces some shear strain in the intervening plastic sheet. When pressing ends, this moves the upper and lower stampers slightly and in mutually opposite directions, as shown.

Therefore, by individually controlling the servos 23, 25, 27 closing the gap between the first and second tool halves, it becomes possible to move the floating stampers 11, 13 in relation to each other. The use of three or more servos allows the upper tool half 3 to present any inclination vis-à-vis the lower tool half 5 within a wide range.

The control unit can therefore, based on the output from the cameras and e.g. an internal lookup table, produce a suitable servo control sequence, that allows the misalignment between the upper and lower stampers 11, 13 to remain within allowed limits for a long set of production cycles. It is also possible to use an algorithm controlling the servos to deal with any misalignment, for instance based on a PID controller.

By varying the wedge shape as the tools are closed it is possible to make the upper stamper rotate slightly with respect to the lower stamper, thereby counteracting any rotation offset.

It should be understood that the multi-servo control scheme could be based on other error data than the one produced by the cameras in FIG. 2, for instance using direct laser measurements on the stampers themselves in between pressing cycles.

The present disclosure is not restricted to the above described examples and may be varied in different ways within the scope of the appended claims.

The invention claimed is:

1. A method for embossing a plastic sheet between a first tool half and a second tool half, the method comprising:
   heating, via a heating arrangement comprising a coil, the plastic sheet between the first tool half and the second tool half,
   imprinting a pattern and at least a first reference mark on a first face of the plastic sheet and the pattern and at least a second reference mark on a second face of the plastic sheet while pressing the plastic sheet between the first tool half and the second tool half,
   evaluating, via at least one camera the embossed plastic sheet to determine an error data based on the relative position of the first and second reference marks, wherein the error data is determined by evaluating the first and second reference marks in orthogonal directions (x,y) on the first and second faces of the plastic sheet or evaluating the first and second reference marks to detect relative rotation between a first stamper associated with the first tool half and a second stamped associated with the second tool half about an axis orthogonal to a plane of the plastic sheet, and
   controlling, by a control unit, a plurality of servos to adjust the first stamper or the second stamper based on the error data for subsequent embossing operations, and
   closing the first stamper onto the second stamper in an inclined manner to induce shear strain in the plastic sheet and move the first stamper in an opposite direction to the second stamper during embossing to align the pattern imprinted on the first and second faces of the plastic sheet.

2. A tool for embossing a plastic sheet, the tool comprising:
   at least one camera;
   a control unit;
   a heating arrangement comprising a coil;

a first tool half and a second tool half, wherein the plastic sheet is pressed and heated, via the heating arrangement, between the tool halves while a fine optical pattern is imprinted on first and second faces of the plastic sheet by means of a first stamper and a second stamper associated with the first and second tool halves respectively, the first stamper and second stamper being planar stampers; and a plurality of servos configured to adjust the first stamper or the second stamper;

wherein the first and second stampers are configured to imprint at least a first reference mark on the first face of the plastic sheet and at least a second reference mark on the second face of the plastic sheet, wherein the at least one camera evaluates the embossed plastic sheet to determine an error data based on the relative position of the first and second reference marks, wherein determining the error data comprises evaluating the first and second reference marks in orthogonal directions (x,y) on the first and second faces of the plastic sheet or evaluating the first and second reference marks to detect relative rotation between the first stamper and the second stamper about an axis orthogonal to a plane of the plastic sheet, and wherein the control unit is configured to control the plurality of servos to adjust the first stamper or the second stamper based on the error data for subsequent embossing operations to close the first stamper onto the second stamper in an inclined manner to induce shear strain in the plastic sheet and move the first stamper in an opposite direction to the second stamper during embossing to align the fine optical pattern imprinted on first and second faces of the plastic sheet.

3. The tool according to claim 2, wherein at least one of the first and second stampers is floating in relation to the first tool half and the second tool half, respectively.

4. The tool according to claim 2, wherein the first tool half is moved by the plurality of servos and the control unit is configured to control the plurality of servos such that the tool halves are closed in the inclined manner by moving the first stamper.

5. The tool according to claim 2, wherein the at least one camera comprises a first camera and a second camera;

wherein the tool is configured to make two or more further reference marks on the plastic sheet, and the first camera and the second camera evaluate the first reference mark, the second reference mark, and the two or more further reference marks at different locations on the plastic sheet.

6. The tool according to claim 2, wherein the tool is configured to make the reference marks separate from an area where the fine optical pattern is embossed.

7. The tool according to claim 3, wherein the first tool half is moved by the plurality of servos and the control unit is configured to control the plurality of servos such that the tool halves are closed in the inclined manner by moving the first stamper.

8. The tool according to claim 3, wherein the at least one camera comprises a first camera and a second camera;

wherein the tool is configured to make two or more further reference marks on the plastic sheet, and the first camera and the second camera are configured to evaluate the first reference mark, the second reference mark, and the two or more further reference marks at different locations on the plastic sheet.

9. The tool according to claim 4, wherein the at least one camera comprises a first camera and a second camera;

wherein the tool is configured to make two or more further reference marks on the plastic sheet, and the first camera and the second camera are configured to evaluate the first reference mark, the second reference mark, and the two or more further reference marks at different locations on the plastic sheet.

10. The tool according to claim 3, wherein the tool is configured to make the reference marks separate from an area where the fine optical pattern is embossed.

11. The tool according to claim 4, wherein the tool is configured to make the reference marks separate from an area where the fine optical pattern is embossed.

12. The tool according to claim 5, wherein the tool is configured to make the reference marks separate from an area where the fine optical pattern is embossed.

13. An embossing tool comprising:
a first tool half and a second tool half for embossing a plastic sheet between the first and the second tool half;
a heating arrangement comprising a coil;
a control unit;
a camera; and
a plurality of servos;
wherein the plastic sheet is pressed and heated, via the heating arrangement, between the tool halves while a pattern is imprinted on first and second faces of the plastic sheet by means of a first and a second stamper associated with the first and second tool halves respectively, wherein the first stamper is floating with respect to the first tool half or the second stamper is floating with respect to the second tool half;
wherein the first and second stampers are configured to imprint a first reference mark on the first face of the plastic sheet and a second reference mark on the second face of the plastic sheet,
wherein the camera evaluates the plastic sheet to determine an error data based on the relative position of the first and second reference marks, wherein determining the error data comprises evaluating the first and second reference marks in orthogonal directions (x,y) on the first and second faces of the plastic sheet or evaluating the first and second reference marks to detect relative rotation between the first stamper and the second stamper about an axis orthogonal to a plane of the plastic sheet,
wherein the first tool half is configured to be moved by the plurality of servos, and
wherein the control unit is configured to control the plurality of servos, based on the error data, to adjust the first tool half or the second tool half to move the first tool half towards the second tool half during embossing operations in an inclined manner, thereby moving the location of the first stamper in an opposite direction to the second stamper during embossing to induce shear strain in the plastic sheet and align the pattern imprinted on the first and second faces of the plastic sheet.

\* \* \* \* \*